(12) United States Patent
Son et al.

(10) Patent No.: US 8,509,134 B2
(45) Date of Patent: Aug. 13, 2013

(54) APPARATUS AND METHOD FOR NEGOTIATING SLEEP CYCLE SETTING BETWEEN BASE STATION AND MOBILE STATION IN WIRELESS COMMUNICATION SYSTEM

(75) Inventors: Yeong-Moon Son, Yongin-si (KR); Rakesh Taori, Suwon-si (KR); Jung-Je Son, Yongin-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 291 days.

(21) Appl. No.: 12/938,569

(22) Filed: Nov. 3, 2010

(65) Prior Publication Data
US 2011/0103281 A1  May 5, 2011

(30) Foreign Application Priority Data
Nov. 5, 2009  (KR) .................. 10-2009-0106638

(51) Int. Cl.
*G08C 17/00* (2006.01)
(52) U.S. Cl.
USPC ........................................... 370/311
(58) Field of Classification Search
None
See application file for complete search history.

(56) References Cited

U.S. PATENT DOCUMENTS

| 2007/0297438 | A1  | 12/2007 | Meylan et al. |
| 2009/0196209 | A1  | 8/2009  | Haartsen |
| 2010/0002615 | A1* | 1/2010  | Gupta ............................ 370/311 |
| 2010/0008278 | A1* | 1/2010  | Kone et al. .................... 370/311 |
| 2010/0214967 | A1  | 8/2010  | Moelard et al. |
| 2011/0007681 | A1* | 1/2011  | Park et al. ..................... 370/311 |
| 2011/0205972 | A1* | 8/2011  | Yuk et al. ...................... 370/328 |
| 2012/0147902 | A1* | 6/2012  | Kim et al. ...................... 370/474 |

FOREIGN PATENT DOCUMENTS

| EP | 1 903 815 A2  | 3/2008 |
| EP | 1 954 078 A1  | 8/2008 |
| WO | 2008/136640 A2 | 11/2008 |
| WO | 2010/028106 A2 | 3/2010 |

OTHER PUBLICATIONS

Yi Wu et al: "An Enhancement of Sleep Mode Operation in IEEE 802.16e Systems", 2009 IEEE 69th Vehicular Technology Conference; Apr. 26-29, 2009, Barcelona, Spain, IEEE, Piscataway, NJ, USA, Apr. 26, 2009, pp. 1-6, XP013474329, ISBN: 978-1-4244-2517-4.

* cited by examiner

*Primary Examiner* — Raj Jain
(74) *Attorney, Agent, or Firm* — Jefferson IP Law, LLP

(57) ABSTRACT

An apparatus and method for negotiating sleep cycle setting between a base station and a mobile station in a wireless communication system are provided. A method for operating a transmitter to negotiate sleep cycle setting of a mobile station in a wireless communication system includes transmitting a DSx request message including sleep cycle setting information to a receiver, and receiving a DSx response message, which includes at least one of acceptance/refusal information about DSx and acceptance/refusal information about sleep cycle setting change, from the receiver. Herein, the DSx is one of a Dynamic Service Addition (DSA), a Dynamic Service Change (DSC), and a Dynamic Service Deletion (DSD).

24 Claims, 5 Drawing Sheets

APPARATUS AND METHOD FOR NEGOTIATING SLEEP CYCLE SETTING BETWEEN BASE STATION AND MOBILE STATION IN WIRELESS COMMUNICATION SYSTEM

PRIORITY

This application claims the benefit under 35 U.S.C. §119 of a Korean patent application filed in the Korean Intellectual Property Office on Nov. 5, 2009 and assigned Serial No. 10-2009-0106638, the entire disclosure of which is incorporated herein by reference.

BACKGROUND OF THE INVENTION

1. Field of the Invention

The present invention relates to an apparatus and method for negotiating settings between a base station and a mobile station in a wireless communication system. More particularly, the present invention relates to an apparatus and method for negotiating a sleep cycle setting between a base station and a mobile station.

2. Description of the Related Art

Extensive research is being conducted to provide various Quality of Service (QoS) features with a data rate of about 100 Mbps in the advanced fourth-generation (4G) communication systems. The 4 G communication systems are evolving to provide high mobility, high data rate transmission, and high QoS in Broadband Wireless Access (BWA) communication systems such as Local Area Network (LAN) systems and Metropolitan Area Network (MAN) systems, typical examples of which are identified in the Institute of Electrical and Electronics Engineers (IEEE) 802.16 system standards.

The addition/change/deletion of a service flow (i.e., a connection) in the IEEE 802.16m system is the same as a method of using DSx-REQ/RSP messages in the IEEE 802.16e system. That is, for adding a connection, a Mobile Station (MS) transmits a Dynamic Service Addition Request (DSA-REQ) message to a Base Station (BS) (in the event of an MS-initiated DSA), wherein the DSA-REQ message includes parameters necessary for adding the connection. On the other hand, the BS may transmit a DSA-REQ message to the MS (in the event of a BS-initiated DSA). Thereafter, in the event of an MS-initiated DSA, the BS transmits a Dynamic Service Addition Response (DSA-RSP) message to the MS in response to the DSA-REQ message received from the MS. On the other hand, in the event of a BS-initiated DSA, the MS may transmit a DSA-RSP message to the BS in response to the DSA-REQ message received from the BS.

Herein, the DSA-RSP message includes a confirmation code in response to the DSA-REQ message. As a response to the DSA-REQ message, the confirmation code represents an OK/success of a service connection request, or represents a failure of a service connection request and the reason for the failure. For example, if the BS transmits an ACKnowledgement (ACK) (OK/success) message in response to the DSA-REQ message from the MS, it may use '0' as a confirmation code value of the DSA-RSP message. In this case, the DSA-RSP message includes a connection identifier (i.e., a multicast CID or a transport CID) and QoS parameters for the corresponding service. A method of using Dynamic Service Change (DSC)-REQ/RSP messages for changing a connection, or a method of using Dynamic Service Deletion (DSD)-REQ/RSP messages for deleting a connection is similar to the above method of using DSA-REQ/RSP messages for adding a connection, and thus a detailed description thereof will be omitted for conciseness.

The IEEE 802.16 system defines a sleep mode and an idle mode in order to minimize the power consumption of an MS. That is, if there is no communication traffic for an MS for a predetermined time (e.g., timer), the IEEE 802.16 system converts the state of the MS to a sleep mode or an idle mode. The MS may perform a power-down operation for a predetermined period by converting to the sleep mode or the idle mode. The MS does not perform a downlink (DL) channel monitoring operation in the power-down state, thus significantly reducing the power consumption. Also, the BS restricts available resources for the sleep-mode or idle-mode MS (unlike an active-mode MS), thereby increasing the network resource management efficiency.

The sleep mode defined in the IEEE 802.16m system is similar to the sleep mode defined in the IEEE 802.16e system, but it has the following unique characteristics.

First, in the IEEE 802.16 system, an MS and a BS define a sleep pattern operated in a sleep mode. The sleep pattern is called a power-saving class. The power-saving class includes a sleep interval and a listening interval. In the sleep interval, the MS performs a power-down operation. In the listening interval, the MS performs a channel monitoring operation while maintaining synchronization with the BS. In the IEEE 802.16e system, one MS may simultaneously have a plurality of different power-saving classes according to traffic characteristics. A connection made between the MS and the BS may correspond to one or more power-saving classes and the MS may simultaneously operate a plurality of power-saving classes in an overlapping manner. On the contrary, in the IEEE 802.16m system, one MS may have one power-saving class. In this case, if a different power-saving class is applied, it replaces the existing power-saving class.

In the IEEE 802.16 system, a listening window is interleaved between sleep windows. In the case of the sleep mode in the IEEE 802.16e system, the sleep window increases to twice the size of the existing sleep window in a situation where there is no traffic. On the other hand, the MS completely exits the sleep mode in a situation where there is traffic. On the contrary, in the case of the sleep mode in the IEEE 802.16m system, the concept of a sleep cycle (Sleep Cycle=Listening Window+Sleep Window) is introduced. In a negative-traffic situation, the sleep cycle increases to twice the size (the size of a sleep window increases because the size of a listening window is fixed to a default value). In a positive-traffic situation, the corresponding sleep cycle in the sleep mode is reset to the initial sleep cycle without exiting the sleep mode.

Meanwhile, in the IEEE 802.16m system, a conversion between a sleep mode and an active mode is performed by sleep mode-related management messages such as sleep (SLP)-REQ/RSP messages. That is, there is no conversion due to the presence of traffic. Herein, the MS transmits the SLP-REQ/RSP messages to the BS in order to convert from the active mode to the sleep mode, change sleep cycle settings in the sleep mode, or switch to the negotiated sleep cycle setting.

The QoS requirements change when the service flow (i.e., the connection) is added/changed/deleted. One sleep cycle pattern is applied in the sleep mode of the existing IEEE 802.16m system. Therefore, if the QoS requirements change, the sleep cycle pattern used up to that point may be unsuitable. Accordingly, the sleep cycle setting may have to be changed. In this case, by additional SLP-REQ/RSP messages, new sleep cycle settings may be applied, it may be switched to the existing sleep cycle setting, or the current sleep cycle setting may be changed. However, in addition to DSx-REQ/RSP message communication for addition/change/deletion of the service flow, this method requires additional SLP-REQ/RSP message communication in order to change the sleep cycle setting. Such an additional message communication process may cause significant overhead if the QoS requirements change frequently.

SUMMARY OF THE INVENTION

An aspect of the present invention is to address at least the above-mentioned problems and/or disadvantages and to provide at least the advantages described below. Accordingly, an aspect of the present invention is to provide an apparatus and method for negotiating a sleep cycle setting between a base station and a mobile station in a wireless communication system.

Another aspect of the present invention is to provide an apparatus and method for negotiating a sleep cycle setting between a base station and a mobile station in a Institute of Electrical and Electronics Engineers (IEEE) 802.16m wireless communication system, even without transmitting additional SLP-REQ/RSP messages, by inserting sleep cycle setting information into DSx-REQ/RSP messages for addition/change/deletion of a service flow.

According to an aspect of the present invention, a method for operating a transmitter to negotiate sleep cycle setting of a Mobile Station (MS) in a wireless communication system is provided. The method includes, transmitting a DSx request message including sleep cycle setting information to a receiver, and receiving a DSx response message, which includes at least one of acceptance/refusal information about DSx and acceptance/refusal information about sleep cycle setting change, from the receiver, wherein the DSx comprises at least one of a Dynamic Service Addition (DSA), a Dynamic Service Change (DSC), and a Dynamic Service Deletion (DSD).

According to another aspect of the present invention, a method for operating a receiver to negotiate sleep cycle setting of an MS in a wireless communication system is provided. The method includes, receiving a DSx request message including sleep cycle setting information from a transmitter, detecting change-requiring sleep cycle setting through the DSx request message, and transmitting a DSx response message, which includes at least one of acceptance/refusal information about DSx and acceptance/refusal information about sleep cycle setting change, to the transmitter, wherein the DSx comprises at least one of a DSA, a DSC, and a DSD.

According to another aspect of the present invention, an apparatus of a transmitter for negotiating sleep cycle setting of an MS in a wireless communication system is provided. The apparatus includes, a transmitting (TX) modem for transmitting a DSx request message including sleep cycle setting information to a receiver, and a receiving (RX) modem for receiving a DSx response message, which includes at least one of acceptance/refusal information about DSx and acceptance/refusal information about sleep cycle setting change, from the receiver, wherein the DSx comprises at least one of a DSA, a DSC, and a DSD.

According to another aspect of the present invention, an apparatus of a receiver for negotiating sleep cycle setting of an MS in a wireless communication system is provided. The apparatus includes, a receiving (RX) modem for receiving a DSx request message including sleep cycle setting information from a transmitter, a service flow managing unit for detecting a change-requiring sleep cycle setting through the DSx request message, and a transmitting (TX) modem for transmitting a DSx response message, which includes at least one of acceptance/refusal information about DSx and acceptance/refusal information about sleep cycle setting change, to the transmitter, wherein the DSx comprises at least one of a DSA, a DSC, and a DSD.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
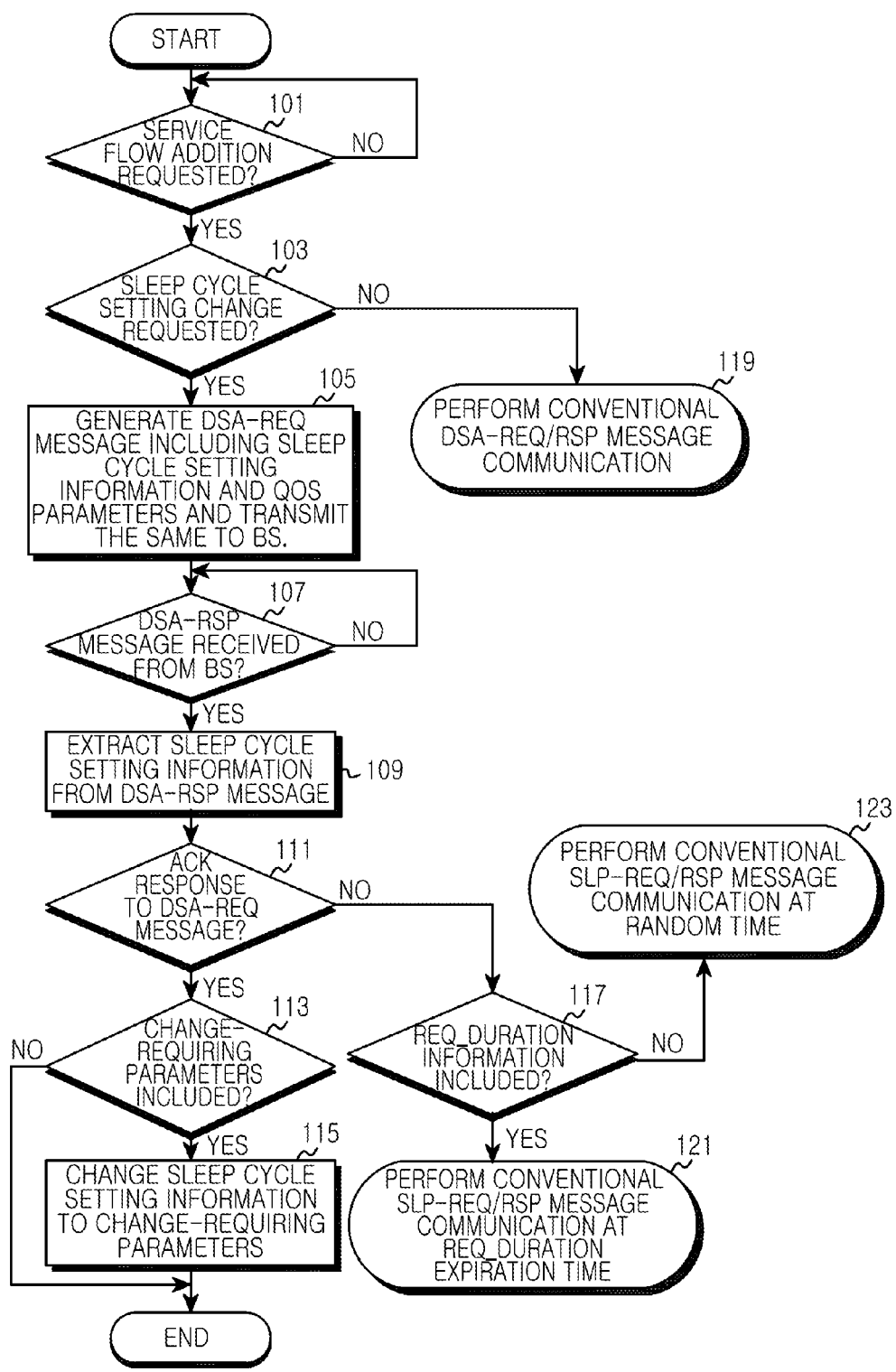
FIG. 1 is a flow diagram illustrating a method for operating a Mobile Station (MS) to negotiate sleep cycle setting between the MS and a Base Station (BS) by exchanging DSA-REQ/RSP messages including sleep cycle setting information between the MS and the BS in the event of an MS-initiated Dynamic Service Addition (DSA) in a wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present invention provides a scheme for negotiating sleep cycle setting between a Base Station (BS) and a Mobile Station (MS) in a wireless communication system, even without transmitting additional SLP-REQ/RSP messages, by inserting sleep cycle setting information into DSx-REQ/RSP messages for addition/change/deletion of a service flow.

The following description is made in the context of an Institute of Electrical and Electronics Engineers (IEEE) 802.16m wireless communication system. However, it is to be understood that the present invention is not so limited. That is, it should be clearly understood that the present invention is applicable to any wireless communication system where one sleep cycle pattern is simultaneously applied to mobile stations.

Also, the following description is made in the context of DSA-REQ/RSP messages for addition of a service flow, to which the present invention is not limited. Thus, it should be clearly understood that the present invention is also applicable to DSC-REQ/RSP messages for change of a service flow and DSD-REQ/RSP messages for deletion of a service flow. Hereinafter, Dynamic Service Addition (DSA), Dynamic Service Change (DSC), and Dynamic Service Deletion (DSD) are commonly called DSx.

FIG. 1 is a flow diagram illustrating a method for operating an MS to negotiate sleep cycle setting between the MS and a BS by exchanging DSA-REQ/RSP messages including sleep cycle setting information between the mobile station and the base station in the event of an MS-initiated DSA in a wireless communication system according to an exemplary embodiment of the present invention.

Referring to FIG. 1, in step 101, the MS determines whether service flow addition is requested.

If it is determined in step 101 that service flow addition is requested, the method proceeds to step 103. In step 103, the MS determines whether a sleep cycle setting change is requested because QoS requirements change according to the service flow addition request.

If it is determined in step 103 that a sleep cycle setting change is not requested, the MS performs conventional DSA-REQ/RSP message communication with the BS to add a service flow in step 119. That is, the MS generates a DSA-REQ message including QoS parameters of the service flow, transmits the generated DSA-REQ message to the BS, and receives a DSA-RSP message including an acknowledgement/non-acknowledgement (ACK/NACK) of the DSA-REQ message from the BS.

On the other hand, if it is determined in step 103 that a sleep cycle setting change is requested, the method proceeds to step 105. In step 105, the MS generates a DSA-REQ message including sleep cycle setting information changing according to the service flow addition request and the QoS parameters of the service flow and transmits the generated DSA-REQ message to the BS.

Herein, the sleep cycle setting information is configured to have a format as shown in Table 1.

TABLE 1

| Name | Length | Value |
| --- | --- | --- |
| Sleep Cycle setting | Variable | Compound TLV |

Herein, if the sleep cycle setting information formatted as shown in Table 1 is included in the DSA-REQ message transmitted by the MS, the BS determines that the DSA-REQ message is to request sleep cycle setting change together with service flow addition.

Herein, the sleep cycle setting information is configured to include parameters as shown in Table 2.

TABLE 2

| Name | Length | Value |
| --- | --- | --- |
| Operation | 1 | 0b00: Exit from Sleep Mode<br>0b01: Enter Sleep Mode<br>0b10: Change Sleep Mode<br>0b11: Switch Sleep Cycle setting |
| if(Operation != 0b00) { | | |
| SCID | 1 | Sleep Cycle ID |
| Start Frame Number | 1 | Least Significant 6 bits of Frame Number |
| if(Operation != 0b11) { | | |
| LWEF | 1 | Listening Window Extension Flag<br>0: Listening Window Extension is disabled<br>1: Listening Window Extension is enabled |
| TIMF | 1 | Traffic Indication Message Flag<br>0: TRF-IND message is not sent for the MS<br>1: TRF-IND message is sent to the MS during every Listening Window |
| NISCF | 1 | New Initial sleep cycle indicator |
| Initial Sleep Cycle | 2 | |

TABLE 2-continued

| Name | | Length | Value |
|---|---|---|---|
| | Final Sleep Cycle | 2 | |
| | Listening Window | 1 | |
| | Listening sub-frame bitmap | 1 | The bitmap indicates the sub-frames in each frame where the MS needs to remain awake 0xF: MS shall remain awake during entire sub-frames in each frame during Listening Window |
| | If(NISCF == 1) { | | |
| |   New Initial Sleep Cycle | 1 | |
| | } | | |
| | If(LWEF == 1) { | | |
| |   T_MS | 1 | |
| | } | | |
| | } | | |
| } | | | |

In Table 1, the 'Operation' indicates the operation type of a DSA-REQ message. That is, the 'Operation' indicates that the DSA-REQ message is transmitted to exit a sleep mode ('0b00'), to enter a sleep mode ('0b01'), to change the existing sleep mode ('0b10'), or to switch sleep cycle setting negotiated when the MS enters a sleep mode ('0b11'). The 'SCID' indicates an identifier for identifying the currently-requested sleep cycle setting information. The 'Start Frame Number' indicates the application time of new sleep cycle setting. The 'LWEF' indicates a listening window extension flag. 'TIMF' is a traffic indication message flag that indicates whether to transmit a TRF-IND notifying the presence/absence of downlink (DL) traffic to the MS. The 'New Initial Sleep Cycle Flag (NISCF)' is a new initial sleep cycle indicator for indicating whether a new initial sleep cycle is present in the sleep cycle setting information. Basically, during a listening window, in the event of the presence of traffic, the current sleep cycle is reset to the initial sleep cycle as described above. However, if the 'NISCF' is set to '1', it is reset to the new initial sleep cycle value provided together with the 'NISCF'. The 'Initial Sleep Cycle' indicates the initial sleep cycle of the sleep cycle pattern, and the 'Final Sleep Cycle' indicates the final sleep cycle of a sleep cycle pattern. The 'Listening Window' indicates a default listening window interval during which the MS may communicate data with the BS. The 'Listening sub-frame bitmap' is used to indicate a sub-frame in which the MS needs to remain awake if the MS performs a sleep-mode operation at a sub-frame level in a frame constituting a listening window. The 'New Initial Sleep Cycle' is a parameter that is included if the 'NISCF' is set to '1', which is used to reset the sleep cycle to a specific value other than the initial sleep cycle. The 'T_MS' is a timer that is used if the listening window is extended.

Thereafter, in step 107, the MS determines whether a DSA-RSP message is received from the BS.

If it is determined in step 107 that a DSA-RSP message is received from the BS, the method proceeds to step 109. In step 109, the MS extracts sleep cycle setting information from the DSA-RSP message. Although not illustrated in FIG. 1, the MS may identify a confirmation code in the received DSA-RSP message to detect the response to the DSA-REQ message, i.e., the acknowledgement/non-acknowledgement of the DSA and the acknowledgement/non-acknowledgement of the sleep cycle setting change. The MS extracts sleep cycle setting information from the DSA-RSP message only when it is set to a value (e.g., '0') indicating the acknowledgement of the DSA-REQ message.

Herein, the sleep cycle setting information included in the DSA-RSP message is also configured to have a format as shown in Table 1. The sleep cycle setting information included in the DSA-RSP message is configured to include parameters as shown in Table 3.

TABLE 3

| Name | Length | Value |
|---|---|---|
| Response_Code | 2 | 0b00: Request by ABS in Unsolicited manner (Only for BS-Initiated DSx-REQ) 0b01: Approval of MS's request (Only for MS-Initiated DSx-REQ) 0b10: Rejection of MS's request (Only for MS-Initiated DSx-REQ) 0b11: Reserved |
| if(Response_Code == 0b00 \|\| Response_Code == 0b01) { | | |
|   Operation | 2 | 0b00: Exit Sleep Mode 0b01: Enter Sleep Mode 0b10: Change Sleep Mode 0b11: Switch Sleep Cycle setting |
|   if(Operation != 0b00) { | | |
|     SCID | | Sleep Cycle ID |
|     Start Frame Number | 6 | Least Significant 6 bits of Frame Number |

TABLE 3-continued

| Name | Length | Value |
|---|---|---|
| if(Operation != 0b11) { | | |
|     TIMF | 1 | 0: Traffic Indication via TRF-IND message is disabled<br>1: Traffic Indication via TRF-IND message is enabled |
|     NISCF | | |
|     LWEF | 1 | Listening Window Extension Flag<br>0: Listening Window Extension is disabled<br>1: Listening Window Extension is enabled |
|     Initial Sleep Cycle | 8 | |
|     Final Sleep Cycle | 10 | |
|     Listening Window | 6 | |
|     Listening sub-frame bitmap | 8 | The bitmap indicates the sub-frames in each frame where the MS needs to remain awake<br>0xF: MS shall remain awake during entire sub-frames in each frame during Listening Window |
|     if(TIMF == 1) { | | |
|         SLPID | 10 | |
|     } | | |
|     If(NISCF == 1) { | | |
|         New Initial Sleep Cycle | 6 | |
|     } | | |
|     If(LWEF == 1) { | | |
|         T_MS | 6 | |
|     } | | |
| } | | |
| } | | |
| else if (Response_Code == 0b10) { | | |
|     REQ_duration | 8 | Least Significant 8 bits of Frame Number |
| } | | |
| } | | |

In Table 3, the 'Response_Code' indicates the response type of a DSA-RSP message. That is, the 'Response_Code' indicates an unsolicited transmission or a response to the request of the MS. In the case of an unsolicited transmission, the MS must comply with the request of the BS. The 'Response-Code' indicates that the DSA-RSP message is transmitted to be in an unsolicited manner ('0b00'), to accept the request of the MS ('0b01'), or to refuse the request of the MS ('0b10'). Herein, in the case of an MS-initiated DSA, the 'Response_Code in the sleep cycle setting information of the DSA-RSP message may be set to only '0b01' and '0b10'. The 'Operation' indicates the operation type of a DSA-RSP message. That is, the 'Operation' is to indicate entering the sleep mode, exiting the sleep mode, changing the sleep mode, or switching the sleep cycle setting. The 'SCID' indicates an identifier for identifying the currently-requesting/accepting sleep cycle setting information. The 'Start Frame Number' indicates the application time of new sleep cycle setting. The 'LWEF' indicates a listening window extension flag. 'TIMF' is a traffic indication message flag that indicates whether to transmit a TRF-IND notifying of the presence/absence of downlink (DL) traffic to the MS. The 'New Initial Sleep Cycle Flag (NISCF)' is a new initial sleep cycle indicator for indicating whether a new initial sleep cycle is present in the sleep cycle setting information. Basically, during a listening window, in the event of the presence of traffic, the current sleep cycle is reset to the initial sleep cycle as described above. However, if the 'NISCF' is set to '1', it is reset to the new initial sleep cycle value provided together with the 'NISCF'. The 'Initial Sleep Cycle' indicates the initial sleep cycle of the sleep cycle pattern, and the 'Final Sleep Cycle' indicates the final sleep cycle of a sleep cycle pattern. The 'Listening Window' indicates a default listening window interval during which the MS may communicate data with the BS. The 'Listening sub-frame bitmap' is used to indicate a sub-frame in which the MS needs to remain awake if the MS performs a sleep-mode operation at a sub-frame level in a frame constituting a listening window. The 'Sleep ID (SLPID)' is an identifier for traffic indication allocated to an MS when a TRF-IND message is transmitted to the MS. The MS detects the presence/absence of downlink (DL) traffic by using the 'SLPID' to determine whether the corresponding SLPID is included in the TFR-IND message or whether a bit mapped to the SLPID is set to '1' in a SLPID bitmap within the TRF-IND message. The 'New Initial Sleep Cycle' is a parameter that is included if the 'NISCF' is set to '1', which is used to reset the sleep cycle to a specific value other than the initial sleep cycle. The 'T_MS' is a timer that is used if the listening window is extended. The 'REQ_duration' is standby time information for transmission of an SLP-REQ message. That is, when the BS refuses the request of the MS, the MS uses the SLP-REQ message to again request sleep cycle setting information change after the REQ_duration time.

Thereafter, in step 111, the MS determines whether the ACK of the DSA-REQ message is included in the extracted sleep cycle setting information. This may be determined by determining whether the 'Response_code' in the sleep cycle setting information is set to the value ('0b01') indicating the acceptance of the request of the MS.

Herein, if the 'Response_code' is set to the value indicating the acceptance of the request of the MS, the remaining parameters in the sleep cycle setting information may include only new parameters or parameters having different values when compared to the parameters within the sleep cycle setting information included in the DSA-REQ message by the MS. This means that the BS accepts the request of the MS but there is a need to change some parameters to values preferred by the BS.

Thus, if it is determined in step 111 that the ACK of the DSA-REQ message is included in the extracted sleep cycle setting information, the method proceeds to step 113. In step 113, the MS determines whether change-requiring parameters are included in the extracted sleep cycle setting information. If it is determined in step 113 that change-requiring parameters are not included in the extracted sleep cycle setting information, the MS determines that the sleep cycle setting has been changed according to the request of the MS, and ends the algorithm according to the present invention. On the other hand, if it is determined in step 113 that change-requiring parameters are included in the extracted sleep cycle setting information, the method proceeds to step 115. In step 115, the MS changes its own sleep cycle setting information to the change-requiring parameters, and ends the algorithm according to the present invention.

On the other hand, if the 'Response_code' in the sleep cycle setting information is set to the value ('0b10') indicating the refusal of the request of the MS, this means that the MS may transmit an SLP-REQ message to the BS at any time when it desires to again negotiate with the BS on the sleep cycle setting. If REQ_duration information is included in the sleep cycle setting information, the SLP-REQ message may be transmitted at the expiration of the REQ_duration.

Thus, if it is determined in step 111 that the NACK of the DSA-REQ message is included in the extracted sleep cycle setting information, the method proceeds to step 117. In step 117, the MS determines whether REQ_duration information is included in the extracted sleep cycle setting information. If it is determined in step 117 that REQ_duration information is included in the extracted sleep cycle setting information, the MS performs conventional SLP-REQ/RSP message communication with the BS at the expiration of the REQ_duration in step 121. On the other hand, if it is determined in step 117 that REQ_duration information is not included in the extracted sleep cycle setting information, the MS performs conventional SLP-REQ/RSP message communication with the BS at a random time in step 123.

As another exemplary embodiment, the BS may transmit a DSA-RSP message not including sleep cycle setting information to the MS, as the NACK of a DSA-REQ message received from the MS. Thus, in this case, the MS may identify the DSA-RSP message received from the BS and may determine that the BS refuses the request for the sleep cycle setting of the MS, if the sleep cycle setting information is not included in the DSA-RSP message.

Figure 2:
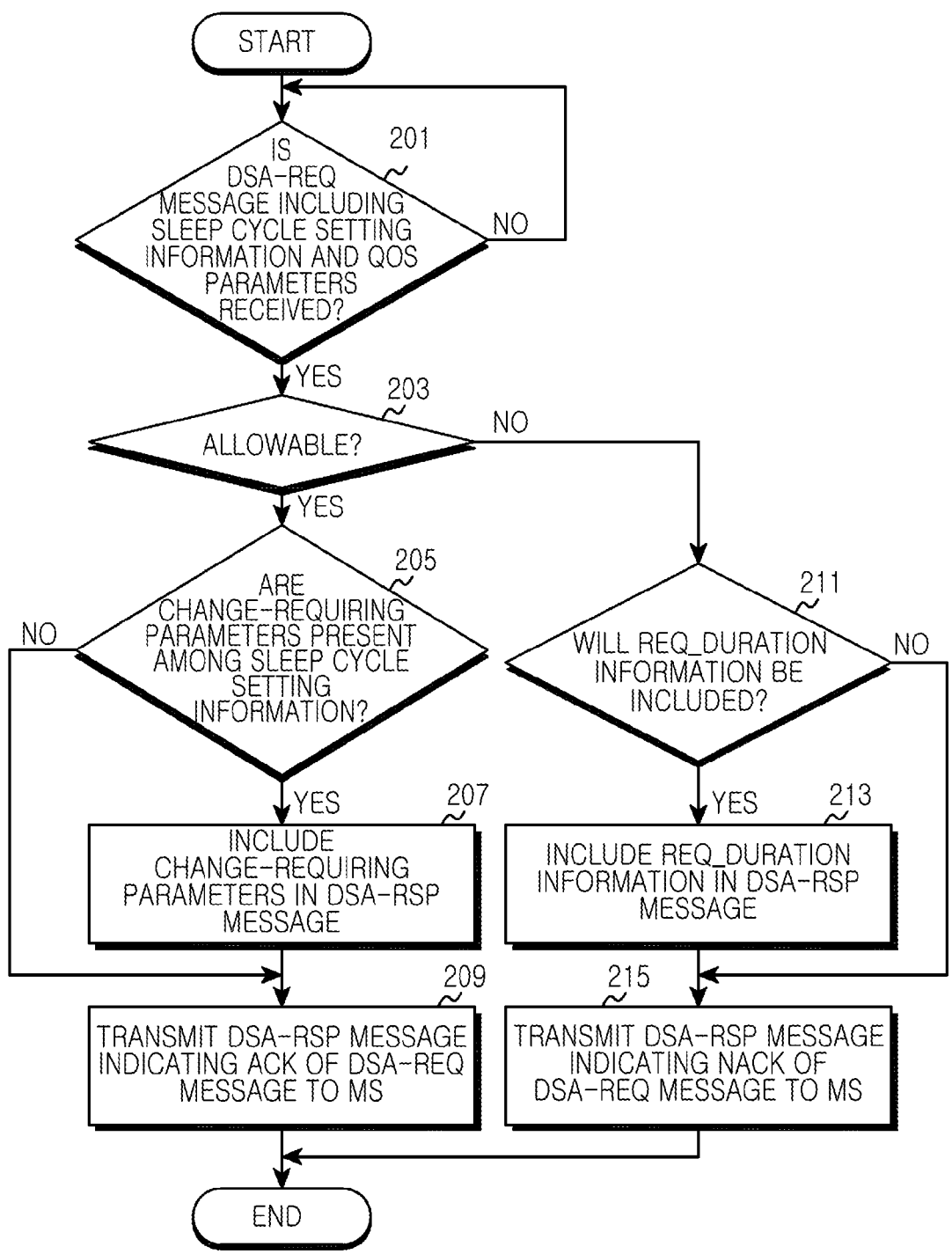
FIG. 2 is a flow diagram illustrating a method for operating a BS to negotiate sleep cycle setting between an MS and the BS by exchanging DSA-REQ/RSP messages including sleep cycle setting information between the MS and the BS in the event of an MS-initiated DSA in a wireless communication system according to an exemplary embodiment of the present invention.

FIG. 2 is a flow diagram illustrating a method for operating a BS to negotiate sleep cycle setting between an MS and the BS by exchanging DSA-REQ/RSP messages including sleep cycle setting information between the MS and the BS in the event of an MS-initiated DSA in a wireless communication system according to an exemplary embodiment of the present invention.

Referring to FIG. 2, in step 201, the BS determines whether it receives a DSA-REQ message including sleep cycle setting information changing according to a service flow addition request and QoS parameters of the service flow. Herein, the sleep cycle setting information is configured to include parameters as shown in Table 2.

If it is determined in step 201 that the DSA-REQ message including the sleep cycle setting information and the QoS parameters is received, the method proceeds to step 203. In step 203, the BS uses the DSA-REQ message to determine whether the service flow addition and the sleep cycle setting are allowable.

If it is determined in step 203 that the service flow addition and the sleep cycle setting are allowable, the method proceeds to step 205. In step 205, the BS determines whether change-requiring parameters are present among the sleep cycle setting information within the received DSA-REQ message.

If it is determined in step 205 that change-requiring parameters are present among the sleep cycle setting information within the received DSA-REQ message, the method proceeds to step 207. In step 207, the BS includes the change-requiring parameters in the sleep cycle setting information within the DSA-RSP message. In step 209, the BS transmits a DSA-RSP message indicating the ACK of the DSA-REQ message to the MS. Herein, in order to indicate the ACK of the DSA-REQ message, a confirmation code in the DSA-RSP message may be set to a value of, for example, '0' and a Response_Code in the sleep cycle setting information may be set to a value of, for example, '0b01'. Herein, the DSA-RSP message is a response to the DSA-REQ message, that is, a message for notifying the acknowledgement/non-acknowledgement of the DSA and the acknowledgement/non-acknowledgement of the sleep cycle setting change.

On the other hand, if it is determined in step 205 that change-requiring parameters are not present among the sleep cycle setting information within the received DSA-REQ message, the method proceeds directly to step 209. In step 209, the BS transmits a DSA-RSP message indicating the ACK of the DSA-REQ message to the MS. Herein, in order to indicate the ACK of the DSA-REQ message, a confirmation code in the DSA-RSP message may be set to a value of, for example, '0' and a Response_Code in the sleep cycle setting information may be set to a value of, for example, '0b01'.

On the other hand, it is determined in step 203 that service flow addition and the sleep cycle setting are not allowable, the method proceeds to step 211. In step 211, the BS determines whether to include REQ_duration information in the sleep cycle setting information within the DSA-RSP message. Herein, the REQ_duration information is information about a predetermined time for again requesting sleep cycle setting information change by using an SLP-REQ message.

If it is determined in step 211 that the REQ_duration information is to be included in the sleep cycle setting information within the DSA-RSP message, the method proceeds to step 213. In step 213, the BS includes the REQ_duration information in the sleep cycle setting information within the DSA-RSP message. In step 215, the BS transmits a DSA-RSP message indicating the NACK of the DSA-REQ message to the MS. Herein, in order to indicate the NACK of the DSA-REQ message, a confirmation code in the DSA-RSP message may be set to a value other than '0' and a Response_Code in the sleep cycle setting information may be set to a value of, for example, '0b10'.

On the other hand, if it is determined in step 211 that the REQ_duration information is not to be included in the sleep cycle setting information within the DSA-RSP message, the method proceeds directly to step 215. In step 215, the BS transmits a DSA-RSP message indicating the NACK of the DSA-REQ message to the MS. Herein, in order to indicate the NACK of the DSA-REQ message, a confirmation code in the DSA-RSP message may be set to a value other than '0' and a Response_Code in the sleep cycle setting information may be set to a value of, for example, '0b10'. If it is determined that the REQ_duration information is not to be included in the sleep cycle setting information within the DSA-RSP message, the inclusion of the sleep cycle setting information in the DSA-RSP message may result in an overhead increase. Thus, in this case, the sleep cycle setting information may not be included in the DSA-RSP message. That is, the non-inclusion of the sleep cycle setting information in the DSA-RSP message may be used to indicate that the BS refuses the request for the sleep cycle setting of the MS.

Figure 3:
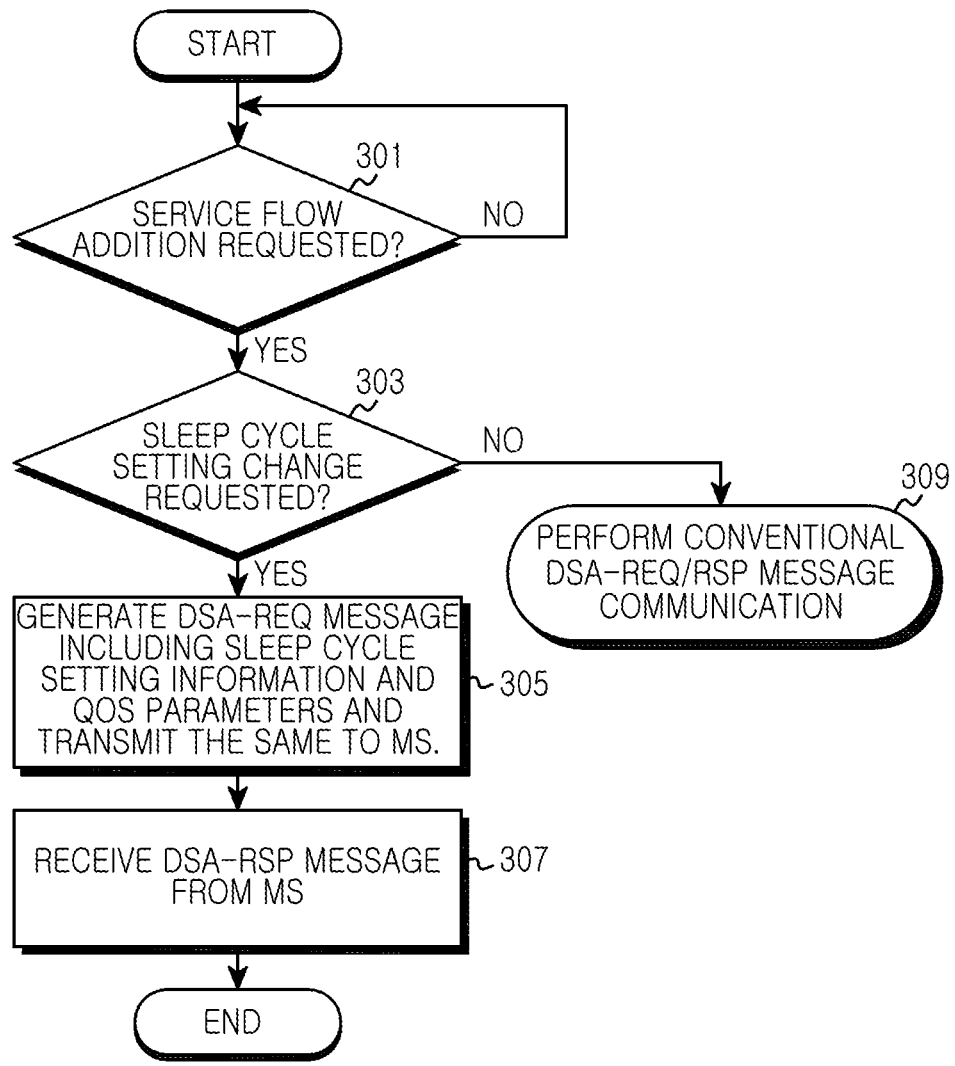
FIG. 3 is a flow diagram illustrating a method for operating a BS to negotiate sleep cycle setting between an MS and the BS by exchanging DSA-REQ/RSP messages including sleep cycle setting information between the MS and the BS in the event of a BS-initiated DSA in a wireless communication system according to an exemplary embodiment of the present invention.

FIG. 3 is a flow diagram illustrating a method for operating a BS to negotiate sleep cycle setting between an MS and the BS by exchanging DSA-REQ/RSP messages including sleep cycle setting information between the MS and the BS in the event of a BS-initiated DSA in a wireless communication system according to an exemplary embodiment of the present invention.

Referring to FIG. 3, in step 301, the BS determines whether service flow addition is requested.

If it is determined in step 301 that service flow addition is requested, the method proceeds to step 303. In step 303, the BS determines whether a sleep cycle setting change is requested because QoS requirements change according to the service flow addition request.

If it is determined in step 303 that a sleep cycle setting change is not requested, the BS performs conventional DSA-REQ/RSP message communication with the MS in step 309. That is, the BS generates a DSA-REQ message including QoS parameters of the service flow, transmits the generated DSA-REQ message to the MS, and receives a DSA-RSP message including an acknowledgement/non-acknowledgement (ACK/NACK) of the DSA-REQ message from the MS.

On the other hand, if it is determined in step 303 that a sleep cycle setting change is requested the method proceeds to step 305. In step 305, the BS generates a DSA-REQ message including sleep cycle setting change information according to the service flow addition request and the QoS parameters of the service flow and transmits the generated DSA-REQ message to the MS. In the case of a BS-initiated DSA, the inclusion of the sleep cycle setting information in the DSA-REQ message is regarded as an unsolicited SLP-RSP message. That is, the BS unilaterally requests the MS to change the sleep cycle setting information, and the MS must comply with the unilateral request of the BS.

Herein, the sleep cycle setting information is configured to have a format as shown in Table 1. The sleep cycle setting information included in the DSA-REQ message is configured to include parameters as shown in Table 4.

TABLE 4

| Name | Length | Value |
|---|---|---|
| Response_Code | 2 | 0b00: Request by ABS in Unsolicited manner (Only for BS-Initiated DSx-REQ)<br>0b01: Approval of MS's request (Only for MS-Initiated DSx-REQ)<br>0b10: Rejection of MS's request (Only for MS-Initiated DSx-REQ)<br>0b11: Reserved |
| if(Response_Code == 0b00) { | | |
| Operation | 2 | 0b00: Exit Sleep Mode<br>0b01: Enter Sleep Mode<br>0b10: Change Sleep Mode<br>0b11: Switch Sleep Cycle setting |
| if(Operation != 0b00) { | | |
| SCID | | Sleep Cycle ID |
| Start_Frame_Number | 6 | Least Significant 6 bits of Frame Number |
| if(Operation != 0b11) { | | |
| TIMF | 1 | 0: Traffic Indication via TRF-IND message is disabled<br>1: Traffic Indication via TRF-IND message is enabled |
| NISCF | | |
| LWEF | 1 | Listening Window Extension Flag<br>0: Listening Window Extension is disabled<br>1: Listening Window Extension is enabled |
| Initial Sleep Cycle | 8 | |
| Final Sleep Cycle | 10 | |
| Listening Window | 6 | |
| Listening sub-frame bitmap | 8 | The bitmap indicates the sub-frames in each frame where the MS needs to remain awake<br>0xF: MS shall remain awake during entire sub-frames in each frame during Listening Window |
| if(TIMF == 1) { | | |
| SLPID | 10 | |
| } | | |
| If(NISCF == 1) { | | |
| New Initial Sleep Cycle | 6 | |
| } | | |

TABLE 4-continued

| Name | Length | Value |
|---|---|---|
| If(LWEF == 1) {<br>    T_MS<br>    }<br>    }<br>    }<br>} | 6 | |

Herein, the sleep cycle setting information of the DSA-REQ message transmitted from the BS to the MS includes similar parameters to the DSA-RSP message transmitted from the BS to the MS in the case of the MS-initiated DSA. Herein, in the case of a BS-initiated DSA, a Response_Code in the sleep cycle setting information of the DSA-REQ message may be set to only '0b00'. The difference from the case of the MS-initiated DSA is that the parameters to be included in the sleep cycle setting information by the BS include almost all the parameters as shown in Table 4, because there is no parameter negotiation between the MS and the BS. Also, there is no need to include REQ_duration. Meanwhile, because the Response_Code is set to only '0b00', it may be omitted from the sleep cycle setting information included in the DSA-REQ message, for overhead reduction. That is, the inclusion of the sleep cycle setting information in the BS-initiated DSA-REQ message may cause the MS to consider that the BS attempts to change the unsolicited sleep cycle setting information. Also, the inclusion of the confirmation code set to '0' in the DSA-RSP message may cause the BS to consider that the MS accepts the service flow addition and the sleep cycle setting change with respect to the request of the BS. In this manner, the BS may identify the confirmation code in the DSA-RSP message to detect the acknowledgement/non-acknowledgement of the DSA and the acknowledgement/non-acknowledgement of the sleep cycle setting change.

Thereafter, in step 307, the BS receives a DSA-RSP message from the MS. The BS may use the DSA-RSP message to detect the response to the DSA-REQ message, that is, the acknowledgement/non-acknowledgement of the DSA and the acknowledgement/non-acknowledgement of the sleep cycle setting change. Herein, the MS may set the confirmation code of the DSA-RSP message to '0' in order to accept the request for the service flow of the BS, and may set the confirmation code of the DSA-RSP message to a value other than '0' in order to refuse the request for the service flow of the BS. Thus, if the confirmation code of the DSA-RSP message received from the MS is set to a value other than '0', the BS considers that the request for both the service flow and the sleep cycle setting change is refused, and disregards the sleep cycle setting information. If the confirmation code of the DSA-RSP message received from the MS is set to a value of '0', the BS considers that both the service flow addition and the sleep cycle setting change are performed normally.

Thereafter, the BS ends the algorithm according to the present invention.

Figure 4:
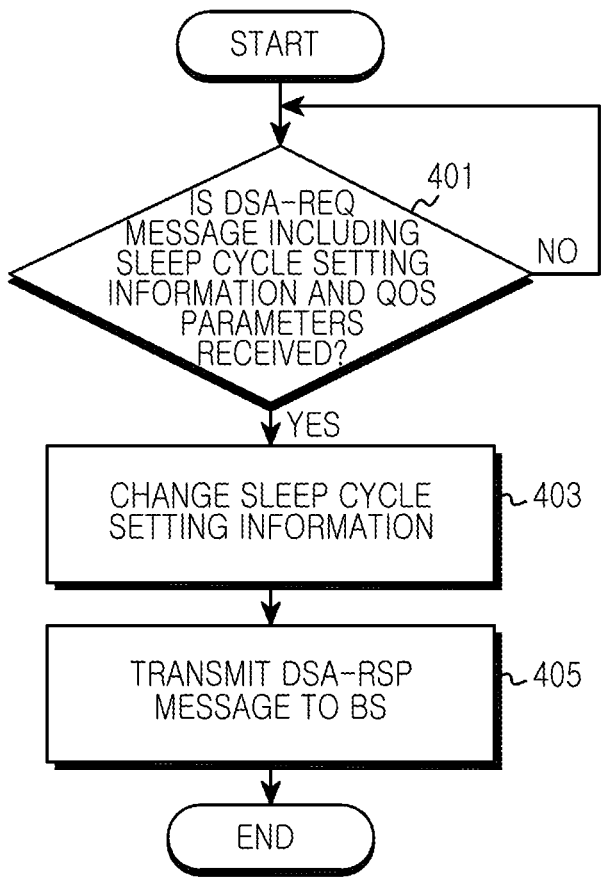
FIG. 4 is a flow diagram illustrating a method for operating an MS to negotiate sleep cycle setting between the MS and a BS by exchanging DSA-REQ/RSP messages including sleep cycle setting information between the MS and the BS in the event of a BS-initiated DSA in a wireless communication system according to an exemplary embodiment of the present invention.

FIG. 4 is a flow diagram illustrating a method for operating an MS to negotiate sleep cycle setting between the MS and a BS by exchanging DSA-REQ/RSP messages including sleep cycle setting information between the MS and the BS in the event of a BS-initiated DSA in a wireless communication system according to an exemplary embodiment of the present invention.

Referring to FIG. 4, in step 401, the MS determines whether it receives a DSA-REQ message including sleep cycle setting information changing according to a service flow addition request and QoS parameters of the service flow. Herein, the sleep cycle setting information is configured to include parameters as shown in Table 4.

If it is determined in step 401 that the DSA-REQ message including the sleep cycle setting information and the QoS parameters is received, the method proceeds to step 403. In step 403, the MS changes the sleep cycle setting information of the MS into the sleep cycle setting information acquired through the DSA-REQ message. Although not illustrated in FIG. 4, the MS receives the DSA-REQ message to determine whether to accept the request for the service flow of the BS. Only when determining to accept the request for the service flow of the BS, the MS changes the sleep cycle setting information of the MS into the sleep cycle setting information acquired through the DSA-REQ message.

Thereafter, in step 405, the MS transmits a DSA-RSP message, which is to notify the response to the DSA-REQ message, that is, the acknowledgement/non-acknowledgement of the DSA and the acknowledgement/non-acknowledgement of the sleep cycle setting change, to the BS. Herein, the MS may set the confirmation code of the DSA-RSP message to '0' in order to accept the request for the service flow of the BS, and may set the confirmation code of the DSA-RSP message to a value other than '0' in order to refuse the request for the service flow of the BS.

Thereafter, the MS ends the algorithm according to the present invention.

Figure 5:
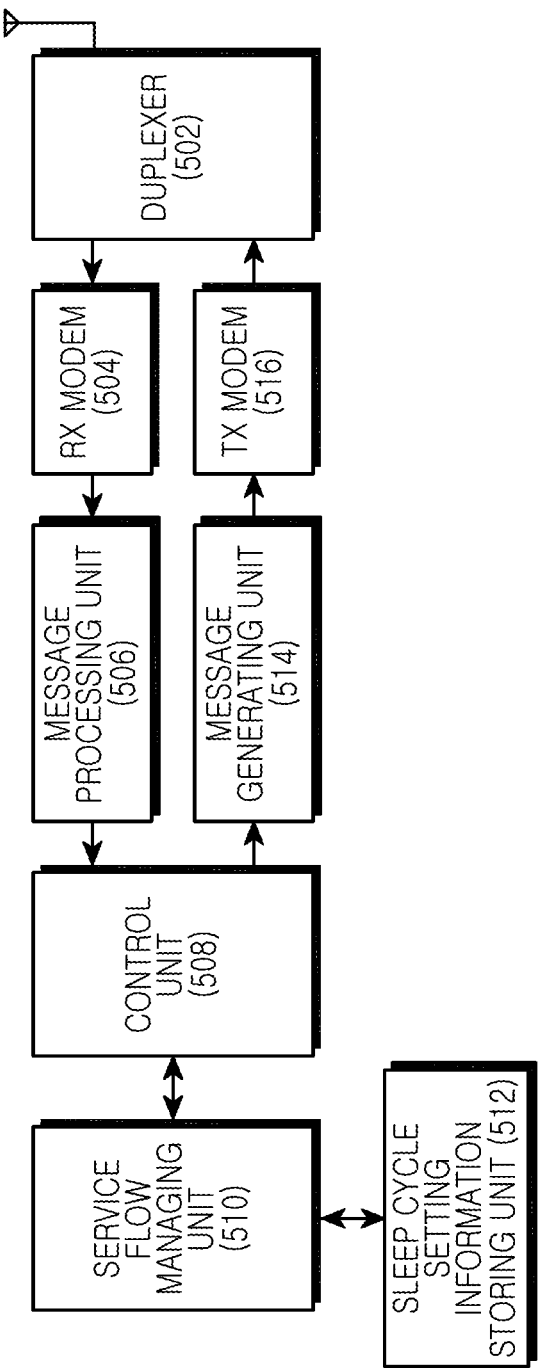
FIG. 5 is a block diagram of a BS (or an MS) in a wireless communication system according to an exemplary embodiment of the present invention.

FIG. 5 is a block diagram of a BS (or an MS) in a wireless communication system according to an exemplary embodiment of the present invention.

Herein, a BS and an MS have the substantially the same configuration.

Referring to FIG. 5, the BS (or MS) includes a duplexer 502, a receiving (RX) modem 504, a message processing unit 506, a control unit 508, a service flow managing unit 510, a sleep cycle setting information storing unit 512, a message generating unit 514, and a transmitting (TX) modem.

Regarding the configuration of the BS, according to the duplex scheme, the duplexer 502 transmits a TX signal, received from the TX modem 516, through an antenna, and provides an RX signal, received from the antenna, to the RX modem 504.

The RX modem 504 recovers data from the signal received from the duplexer 502, and provides the data to the message processing unit 506. For example, the RX modem 504 includes an RF receiving block, a demodulation block, and a channel decoding block. Herein, the RF receiving block includes a filter and an RF preprocessor. If the wireless communication system uses an Orthogonal Frequency Division Multiplexing (OFDM) scheme, the demodulation block includes a Fast Fourier Transform (FFT) processor for extracting data carried in each subcarrier. The channel decoding block includes a demodulator, a deinterleaver, and a channel decoder.

The message processing unit 506 analyzes a message received from the MS through the RX modem 504, and provides the results to the control unit 508.

The control unit 508 controls operations of the BS. More particularly, the control unit 508 provides service flow addition/change/deletion-related control information, received from the message processing unit 506, to the service flow managing unit 510, and provides service flow addition/change/deletion-related information, received from the service flow managing unit 510, to the message generating unit 514.

In the case of an MS-initiated DSA, when a DSA-REQ message including sleep cycle setting change information according to a service flow addition request and QoS parameters of the service flow is received through the message processing unit 506, the service flow managing unit 510 uses the message generating unit 514 to generate a DSA-RSP message, which includes change-requiring parameters among the sleep cycle setting information and indicates the ACK of the DSA-REQ message, and transmit the DSA-RSP message to the MS, or uses the message generating unit 514 to generate a DSA-RSP message, which includes REQ-duration information and indicates the NACK of the DSA-REQ message, and transmit the DSA-RSP message to the MS. Also, in the case of a BS-initiated DSA, when a service flow addition is requested and a sleep cycle setting change is requested according to a change in QoS requirements, the service flow managing unit 510 uses the message generating unit 514 to generate a DSA-REQ message, which includes QoS parameters and sleep cycle setting information, and transmit the DSA-REQ message to the MS, and uses the message processing unit 506 to receive a DSA-RSP message from the MS. Such an operation of the service flow managing unit 510 may be similarly applicable to the communication of DSC-REQ/RSP messages for service flow change and the communication of DSD-REQ/RSP messages for service flow deletion.

The sleep cycle setting information storing unit 512 stores the sleep cycle setting information changing according to the addition/change/deletion request for the service flow.

Under the control of the control unit 508, the message generating unit 514 generates a message to be transmitted to the MS and provides the message to the TX modem 516.

The TX modem 516 converts TX data or messages, received from the message generating unit 514, into a format for transmission through radio resources, and provides the same to the duplexer 502. For example, the TX modem 516 includes a channel encoding block, a modulation block, and an RF transmitting block. Herein, the channel encoding block includes a modulator, an interleaver, and a channel encoder. If the wireless communication system uses an OFDM scheme, the modulation block includes an Inverse Fast Fourier Transform (IFFT) processor for mapping data to each subcarrier. The RF transmitting block includes a filter and an RF preprocessor.

Regarding the configuration of the MS, according to the duplex scheme, the duplexer 502 transmits a TX signal, received from the TX modem 516, through an antenna, and provides an RX signal, received from the antenna, to the RX modem 504.

The RX modem 504 recovers data from the signal received from the duplexer 502, and provides the data to the message processing unit 506. For example, the RX modem 504 includes an RF receiving block, a demodulation block, and a channel decoding block. Herein, the RF receiving block includes a filter and an RF preprocessor. If the wireless communication system uses an OFDM scheme, the demodulation block includes an FFT processor for extracting data carried in each subcarrier. The channel decoding block includes a demodulator, a deinterleaver, and a channel decoder.

The message processing unit 506 analyzes a message received from the BS through the RX modem 504, and provides the results to the control unit 508.

The control unit 508 controls operations of the MS. More particularly, the control unit 508 provides service flow addition/change/deletion-related control information, received from the message processing unit 506, to the service flow managing unit 510, and provides service flow addition/change/deletion-related information, received from the service flow managing unit 510, to the message generating unit 514.

In the case of an MS-initiated DSA, when a service flow addition is requested and a sleep cycle setting change is requested according to a change in QoS requirements, the service flow managing unit 510 uses the message generating unit 514 to generate a DSA-REQ message, which includes QoS parameters and sleep cycle setting information, and transmit the DSA-REQ message to the BS, and uses the message processing unit 506 to receive a DSA-RSP message from the BS. The service flow managing unit 510 extracts the sleep cycle setting information from the received DSA-RSP message to determine whether it indicates the ACK/NACK of the DSA-REQ message. If the ACK of the DSA-REQ message is indicated, the service flow managing unit 510 changes its own sleep cycle setting information into change-requiring parameters according to the inclusion/non-inclusion of the change-requiring parameters. On the other hand, if the NACK of the DSA-REQ message is indicated, the service flow managing unit 510 uses the message generating unit 514 to generate and transmit an SLP-REQ message to the BS at the expiration of the REQ_duration according to the inclusion/non-inclusion of the REQ_duration information. If the REQ_duration information is not included, the service flow managing unit 510 uses the message generating unit 514 to generate and transmit an SLP-REQ message to the BS at a random time. Also, in the case of a BS-initiated DSA, when a DSA-REQ message including sleep cycle setting change information according to a service flow addition request and QoS parameters of the service flow is received through the message processing unit 506, the service flow managing unit 510 changes its own sleep cycle setting information into the sleep cycle setting information acquired through the DSA-REQ message, and uses the message generating unit 514 to generate and transmit a DSA-RSP message to the BS. Such an operation of the service flow managing unit 510 may be similarly applicable to the communication of DSC-REQ/RSP messages for service flow change and the communication of DSD-REQ/RSP messages for service flow deletion.

The sleep cycle setting information storing unit 512 stores the sleep cycle setting information changing according to the addition/change/deletion request for the service flow.

Under the control of the control unit 508, the message generating unit 514 generates a message to be transmitted to the BS and provides the message to the TX modem 516.

The TX modem 516 converts TX data or messages, received from the message generating unit 514, into a format for transmission through radio resources, and provides the same to the duplexer 502. For example, the TX modem 516 includes a channel encoding block, a modulation block, and an RF transmitting block. Herein, the channel encoding block includes a modulator, an interleaver, and a channel encoder. If the wireless communication system uses an OFDM scheme, the modulation block includes an IFFT processor for mapping data to each subcarrier. The RF transmitting block includes a filter and an RF preprocessor.

As described above, exemplary embodiments of the present invention provide an apparatus and method for negotiating sleep cycle setting between a BS and an MS in a wireless communication system by inserting sleep cycle setting information into DSx-REQ/RSP messages for addition/change/deletion of a service flow, thereby making it possible to negotiate the sleep cycle setting between the BS and the MS even without transmitting additional SLP-REQ/RSP messages. Accordingly, it is possible to prevent the occurrence of additional message communication due to frequent changes in QoS requirements and thus reduce system overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a transmitter to negotiate a sleep cycle setting of a Mobile Station (MS) in a wireless communication system, the method comprising:
transmitting a DSx request message including sleep cycle setting information to a receiver; and
receiving a DSx response message from the receiver,
wherein the sleep cycle setting information in the DSx request message includes at least one of the operation request type for indicating changing sleep cycle setting or switching sleep cycle setting, a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, a initial sleep cycle for indicating an assigned duration for the initial sleep cycle, and the final sleep cycle for indicating an assigned duration for the final sleep cycle, and
wherein the DSx comprises at least one of a Dynamic Service Addition (DSA), a Dynamic Service Change (DSC), and a Dynamic Service Deletion (DSD).

2. The method of claim 1, wherein, if the transmitter is an MS and the receiver is a Base Station (BS),
the sleep cycle setting information in the DSx request message includes at least one of the operation request type for indicating changing sleep cycle setting or switching sleep cycle setting, a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, a initial sleep cycle for indicating an assigned duration for the initial sleep cycle, and the final sleep cycle for indicating an assigned duration for the final sleep cycle, and
the sleep cycle setting information in the DSx response message includes at least one of the response type of the DSx response message, operation request type for indicating changing sleep cycle setting or switching sleep cycle setting a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, the initial sleep cycle for indicating an assigned duration for the initial sleep cycle, the final sleep cycle for indicating an assigned duration for the final sleep cycle, and REQ duration for again requesting sleep cycle setting information change using a sleep request (SLP-REQ) message,
wherein the response type of the DSx response message is set to one of the acknowledgement (ACK) of the DSx request message and the non-acknowledgement (NACK) of the DSx request message.

3. The method of claim 1, wherein, if the transmitter is an MS and the receiver is a Base Station (BS),
when the receiver determines to accept the sleep cycle setting change, the DSx response message includes at least one of acknowledgement (ACK) of the DSx request message and sleep cycle setting information requiring a change in comparison with the sleep cycle setting information in the DSx request message of the transmitter.

4. The method of claim 1, wherein, if the transmitter is an MS and the receiver is a Base Station (BS),
when the receiver determines to refuse the sleep cycle setting change, the DSx response message includes at least one of non-acknowledgement (NACK) of the DSx request message and standby time information for again requesting sleep cycle setting information change, or the sleep cycle setting information is omitted.

5. The method of claim 4, further comprising transmitting a sleep request message for again requesting the sleep cycle setting information change to the receiver, if the DSx response message includes the NACK of the DSx request message.

6. The method of claim 1,
wherein the sleep cycle is reset to the initial sleep cycle when the NSCF is set to "0", and the sleep cycle is reset to the new sleep cycle when the NSCF is set to "1", and
wherein the response type of the DSx response message is set by the request of the BS in an unsolicited manner.

7. A method for operating a receiver to negotiate a sleep cycle setting of a Mobile Station (MS) in a wireless communication system, the method comprising:
receiving a DSx request message including sleep cycle setting information from a transmitter;
determining a change-requiring sleep cycle setting through the DSx request message; and
transmitting a DSx response message to the transmitter,
wherein, the sleep cycle setting information in the DSx request message includes at least one of the operation request type for indicating changing sleep cycle setting or switching sleep cycle setting, a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, a initial sleep cycle for indicating an assigned duration for the initial sleep cycle, and the final sleep cycle for indicating an assigned duration for the final sleep cycle, and
wherein the DSx comprises at least one of a Dynamic Service Addition (DSA), a Dynamic Service Change (DSC), and (a Dynamic Service Deletion DSD).

8. The method of claim 7, wherein, if the transmitter is an MS and the receiver is a Base Station (BS),
the sleep cycle setting information in the DSx request message includes at least one of the operation request type for indicating changing sleep cycle setting or switching sleep cycle setting, a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, a initial sleep cycle for indicating an assigned duration for the initial sleep cycle, and the final sleep cycle for indicating an assigned duration for the final sleep cycle and the sleep cycle setting information in the DSx response message includes at least one of the response type of the DSx response message, operation request type for indicating changing sleep cycle setting or switching sleep cycle setting a sleep cycle ID (SCID)for identifying the sleep cycle setting information, a start frame number for indicating a start of a new sleep cycle setting, a next sleep cycle flag (NSCF)for indicating the presence/absence of a new initial sleep cycle in the sleep cycle setting information, a new initial sleep cycle, the initial sleep cycle for indicating an assigned duration for the initial sleep cycle, the final sleep cycle for indicating an assigned duration for the final sleep cycle, and REQ duration for again requesting sleep cycle setting information change using a sleep request (SLP-REQ) message, wherein the response type of the DSx response message is set to one of the acknowledgement (ACK) of the DSx request message and the non-acknowledgement (NACK) of the DSx request message.

9. The method of claim 7, further comprising determining whether to accept the sleep cycle setting change, if the transmitter is an MS and the receiver is a Base Station (BS), wherein if the acceptance of the sleep cycle setting change is determined, the DSx response message includes at least one of acknowledgement (ACK) of the DSx request message and sleep cycle setting information requiring a change in comparison with the sleep cycle setting information in the DSx request message of the transmitter.

10. The method of claim 7, further comprising determining whether to accept the sleep cycle setting change, if the transmitter is an MS and the receiver is a Base Station (BS), wherein if the refusal of the sleep cycle setting change is determined, the DSx response message includes at least one of non-acknowledgement (NACK) of the DSx request message and standby time information for again requesting sleep cycle setting information change, or the sleep cycle setting information is omitted.

11. The method of claim 10, further comprising, if the DSx response message includes the non-acknowledgement (NACK) of the DSx request message, disregarding the sleep cycle setting information and receiving a sleep request message for again requesting the sleep cycle setting information change from the transmitter.

12. The method of claim 7, wherein the sleep cycle is reset to the initial sleep cycle when the NSCF is set to "0", and the sleep cycle is reset to the new sleep cycle when the NSCF is set to "1", and wherein the response type of the DSx response message is set by the request of the BS in an unsolicited manner.

13. An apparatus of a transmitter for negotiating a sleep cycle setting of a Mobile Station (MS) in a wireless communication system, the apparatus comprising:

a transmitting (TX) modem for transmitting a DSx request message including sleep cycle setting information to a receiver; and a receiving (RX) modem for receiving a DSx response message, from the receiver, wherein the sleep cycle setting information in the DSx request message includes at least one of the operation request type for indicating changing sleep cycle setting or switching sleep cycle setting, a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, a initial sleep cycle for indicating an assigned duration for the initial sleep cycle, and the final sleep cycle for indicating an assigned duration for the final sleep cycle, and wherein the DSx comprises at least one of a Dynamic Service Addition (DSA), a Dynamic Service Change (DSC), and a Dynamic Service Deletion (DSD).

14. The apparatus of claim 13, wherein, if the transmitter is an MS and the receiver is a Base Station (BS), the sleep cycle setting information in the DSx request message includes at least one of the operation request type for indicating changing sleep cycle setting or switching sleep cycle setting, a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, a initial sleep cycle for indicating an assigned duration for the initial sleep cycle, and the final sleep cycle for indicating an assigned duration for the final sleep cycle, and the sleep cycle setting information in the DSx response message includes at least one of the response type of the DSx response message, operation request type for indicating changing sleep cycle setting or switching sleep cycle setting a sleep cycle ID (SCID)for identifying the sleep cycle setting information, a start frame number for indicating a start of a new sleep cycle setting, a next sleep cycle flag (NSCF)for indicating the presence/absence of a new initial sleep cycle in the sleep cycle setting information, a new initial sleep cycle, the initial sleep cycle for indicating an assigned duration for the initial sleep cycle, the final sleep cycle for indicating an assigned duration for the final sleep cycle, and REQ duration for again requesting sleep cycle setting information change using a sleep request (SLP-REQ) message, wherein the response type of the DSx response message is set to one of acknowledgement (ACK) of DSx request message and non-acknowledgement (NACK) of the DSx request message.

15. The apparatus of claim 13, wherein, if the transmitter is an MS and the receiver is a Base Station (BS), when the receiver determines to accept the sleep cycle setting change, the DSx response message includes at least one of acknowledgement (ACK) of the DSx request message and sleep cycle setting information requiring a change in comparison with the sleep cycle setting information in the DSx request message of the transmitter.

16. The apparatus of claim 13, wherein, if the transmitter is an MS and the receiver is a Base Station (BS), when the receiver determines to refuse the sleep cycle setting change, the DSx response message includes at least one of non-acknowledgement (NACK) of the DSx request message and standby time information for again requesting sleep cycle setting information change, or the sleep cycle setting information is omitted.

17. The apparatus of claim 16, wherein, if the DSx response message includes the non-acknowledgement (NACK) of the DSx request message, the TX modem transmits a sleep request message for again requesting the sleep cycle setting information change to the receiver.

18. The apparatus of claim 13,
wherein the sleep cycle is reset to the initial sleep cycle when the NSCF is set to "0", and the sleep cycle is reset to the new sleep cycle when the NSCF is set to "1", and
wherein the response type of the DSx response message is set by the request of the BS in an unsolicited manner.

19. An apparatus of a receiver for negotiating a sleep cycle setting of a Mobile Station (MS) in a wireless communication system, the apparatus comprising:
a receiving (RX) modem for receiving a DSx request message including sleep cycle setting information from a transmitter;
a service flow managing unit for determining a change-requiring sleep cycle setting through the DSx request message; and
a transmitting (TX) modem for transmitting a DSx response message to the transmitter,
wherein the sleep cycle setting information in the DSx request message includes at least one of the operation request type for indicating changing sleep cycle setting or switching sleep cycle setting, a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, a initial sleep cycle for indicating an assigned duration for the initial sleep cycle, and the final sleep cycle for indicating an assigned duration for the final sleep cycle, and
wherein the DSx comprises at least one of a Dynamic Service Addition (DSA), a Dynamic Service Change (DSC), and a Dynamic Service Deletion (DSD).

20. The apparatus of claim 19, wherein, if the transmitter is an MS and the receiver is a Base Station (BS),
the sleep cycle setting information in the DSx request message includes at least one of the operation request type for indicating changing sleep cycle setting or switching sleep cycle setting, a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, a initial sleep cycle for indicating an assigned duration for the initial sleep cycle, and the final sleep cycle for indicating an assigned duration for the final sleep cycle, and
the sleep cycle setting information in the DSx response message includes at least one of the response type of the DSx response message, operation request type for indicating changing sleep cycle setting or switching sleep cycle setting a sleep cycle ID (SCID) for identifying the sleep cycle setting information, a start frame number for indicating a start of a new sleep cycle setting, a next sleep cycle flag (NSCF) for indicating the presence/absence of a new initial sleep cycle in the sleep cycle setting information, a new initial sleep cycle, the initial sleep cycle for indicating an assigned duration for the initial sleep cycle, the final sleep cycle for indicating an assigned duration for the final sleep cycle, and REQ duration for again requesting sleep cycle setting information change using a sleep request (SLP-REQ) message,
wherein the response type of the DSx response message is set to one of acknowledgement (ACK) of the DSx request message and non-acknowledgement (NACK) of the DSx request message.

21. The apparatus of claim 19, wherein, if the transmitter is a, MS and the receiver is a Base Station (BS),
the service flow managing unit determines whether to accept the sleep cycle setting change,
wherein if the acceptance of the sleep cycle setting change is determined, the DSx response message includes at least one of acknowledgement (ACK) of the DSx request message and sleep cycle setting information requiring a change in comparison with the sleep cycle setting information in the DSx request message of the transmitter.

22. The apparatus of claim 19, wherein, if the transmitter is an MS and the receiver is a Base Station (BS),
the service flow managing unit determines whether to accept the sleep cycle setting change,
wherein, if refusal of the sleep cycle setting change is determined, the DSx response message includes at least one of non-acknowledgement (NACK) of the DSx request message and standby time information for again requesting sleep cycle setting information change, or the sleep cycle setting information is omitted.

23. The apparatus of claim 22, wherein, if the DSx response message includes the non-acknowledgement (NACK) of the DSx request message, the RX modem disregards the sleep cycle setting information and receives a sleep request message for again requesting the sleep cycle setting information change from the transmitter.

24. The apparatus of claim 19,
wherein the sleep cycle is reset to the initial sleep cycle when the NSCF is set to "0", and the sleep cycle is reset to the new sleep cycle when the NSCF is set to "1", and
wherein the response type of the DSx response message is set by the request of the BS in an unsolicited manner.

* * * * *